US005222164A

United States Patent [19]

Bass, Sr. et al.

[11] Patent Number: 5,222,164

[45] Date of Patent: Jun. 22, 1993

[54] ELECTRICALLY ISOLATED OPTICAL CONNECTOR IDENTIFICATION SYSTEM

[75] Inventors: Robert H. Bass, Sr., Raleigh; Bruce A. Hardman, Cary; Sandra M. Harper, Raleigh; Harry Pasterchick, Jr., Raleigh; Miriam L. Weisenbloom, Raleigh, all of N.C.

[73] Assignee: International Business Machines Corporation, Armonk, N.Y.

[21] Appl. No.: 936,154

[22] Filed: Aug. 27, 1992

[51] Int. Cl.[5] .......................... G02B 6/12; H01R 3/00; H01J 40/14

[52] U.S. Cl. ....................................... 385/14; 385/147; 439/488; 439/489; 439/490; 439/577; 250/215; 250/216; 250/208.2

[58] Field of Search ........................ 385/53, 54, 55, 88, 385/89, 92, 14, 147, 12; 439/488, 489, 490, 577; 250/227.11, 208.2, 215, 216, 491.1

[56] References Cited

U.S. PATENT DOCUMENTS

| | | | |
|---|---|---|---|
| 3,649,839 | 3/1972 | Appleton | 250/215 |
| 3,942,859 | 3/1976 | Korodi | 439/490 X |
| 4,811,002 | 5/1989 | Otsubo | 340/687 |
| 4,812,635 | 3/1989 | Kaufmann et al. | 250/208.2 |
| 4,902,244 | 2/1990 | Endo et al. | 439/489 |
| 4,919,508 | 4/1990 | Grace et al. | 606/15 X |
| 4,925,402 | 5/1990 | Inaba et al. | 439/490 |

FOREIGN PATENT DOCUMENTS

| | | | |
|---|---|---|---|
| 53-95187 | 3/1978 | Japan | 439/489 X |
| 58-27283 | 2/1983 | Japan | 439/489 X |
| 0102876 | 4/1989 | Japan | 439/489 |
| 1-92193 | 8/1989 | Japan | 439/489 X |
| 0234372 | 9/1990 | Japan | 439/489 X |
| 3-141569 | 6/1991 | Japan | 439/490 X |
| 2124438 | 2/1984 | United Kingdom | 439/489 X |

*Primary Examiner*—Brian Healy
*Attorney, Agent, or Firm*—Stephen T. Keohane

[57] ABSTRACT

A connector/cable identification system comprises a plug having an extension and a female housing having at least two pairs of optical emitter/sensors. Each emitter/sensor pair detects whether the extension is therebetween. Because different extensions have different lengths or aperture configurations, the type of connector (and thus associated cable) can be determined. Voltage isolation between the cable (i.e., a common carrier transmission line) and the apparatus receiving the cable (i.e., a personal computer) is maintained by physically separating the transmission circuitry from the identification circuitry.

10 Claims, 5 Drawing Sheets

ELECTRICALLY ISOLATED OPTICAL CONNECTOR IDENTIFICATION SYSTEM

BACKGROUND OF THE INVENTION

1. Field of the Invention

The present invention relates to a connector, and more particularly to a connector having a male housing and a female housing and which provides optical emitter/sensor means for identifying the engagement and type of the connector while providing electrical isolation between a connected electrical transmission device and the identification means.

2. Description of the Prior Art

Connectors having a male housing, a female housing, and means to confirm proper fitting between the housings are disclosed in Japanese Laid Open Utility Model Publication No. 53-95187, U.S. Pat. No. 4,925,402, and U.S. Pat. No. 4,902,244.

The connector of Japanese Laid Open Utility Model Publication No. 53-95187 includes a light emitting element, a light detecting device, and a light reflecting plate. The female housing is provided with first and second passageways to allow light from the light emitting element to reach the reflecting plate and allow the reflected light to reach the light detecting device. The first and second passageways are inclined with respect to each other such that light will only be reflected onto the light detecting device if the male and female housings are properly fitted. The connector is provided with an opto-electronic converter element for converting the reflected light incident to the light detecting device to an electric signal. This connector configuration has two significant drawbacks. The complex configuration of light emitting element, light detecting device, reflector, and inclined light passageways (which must be formed in the female housing) increases manufacturing costs. Furthermore, it is not possible to identify the type of connector or any related information using this scheme.

The connector of U.S. Pat. No. 4,925,402 includes a longitudinal guide channel formed in the female housing for receiving a guide member formed on the male housing. The guide member has apertures formed therein and the guide channel has corresponding apertures such that when the male and female housings are properly fitted together, the apertures of each housing will be aligned. An optical detector is used to measure the fitting condition between the housings by moving it the length of the guide channel. The optical detector is provided with an opto-electronic converter which produces a signal for analysis by a computer. This connector configuration allows a determination of the degree of incongruity between the housings and the type of connector. The connector has a significant drawback in that it requires a manual step by the user in addition to engaging the male and female housings, namely moving the optical detector across the guide channel.

The connector of U.S. Pat. No. 4,902,244 includes slits of predetermined widths and spacings formed in a sidewall of the female housing and a black surface on the male housing. When the housings are properly fitted, a bar code is formed by the black surface shown through the slits. By passing a bar code reader across the slits, the type of connector and the condition of the fit between the housings can simultaneously be determined. This method also suffers from the drawback that a separate action by the user is required, namely the implementation of the bar code reader.

None of the prior art provide an economical and reliable method of detecting a connector's engagement and type which does not require manual human interaction. There exists a need for such a connector which also provides electrical isolation between the connected device and the detecting means. In the United States and in Europe, there are safety requirements that different types of connectors from the various countries be detectable with a high degree of voltage isolation. An example is International Standard IEC 950. As a result, metallic identification systems cannot be used.

An example of the need for such a connector is found in IBM's ISDN Basic Rate Adapter which requires the identification of a country's specific cable and/or diagnostic connector/plug type. This identification is needed to insure that the correct software option is used with each cable and connector/plug configuration without any manual human interaction. To comply with certain safety requirements, voltage isolation of 3.75 kilovolts (kV) must be provided between the common carrier transmission circuits and the internal electronics of the adapter circuits. This requirement is intended to protect the computer and the computer user from power surges transmitted through a transmission cable due to, for example, a lightning strike.

OBJECTS OF THE INVENTION

In view of the disadvantages of the prior art connectors, it is an object of the present invention to provide a connector of relatively simple design having male and female housings with means for detecting the proper engagement of the male and female housings and with means for identifying the type of connector being used. By identifying the connector and thus, cable type, different communications networks can be automatically identified, depending upon the particular cable used.

It is a further object of the present invention to provide a connector of the nature described above which provides a high degree of electrical isolation between an electrical transmission cable operably connected to the male housing and the means for identifying the engagement and type of the cable.

It is an object of the present invention to provide a connector as described above which detects the engagement and type of the connector automatically.

It is a further object of the present invention to provide a connector having the above advantages which is relatively easy and inexpensive to manufacture.

It is a further object of the present invention to provide a connector of the nature described above which is reliable and which has detection means with no moving parts that would tend to wear out or become contaminated.

BRIEF SUMMARY OF THE INVENTION

In order to accomplish the objects above, the connector of the present invention comprises a "male" connector plug and a "female" connector receptacle designed to receive the plug. The plug, which is designed to operably engage an electrical transmission cable or similar device, comprises a plug body and an extension formed on one end of the plug body. The receptacle is operably connected with the circuitry of a transmission line/computer interface adapter or like device and includes means for transmitting current between the plug and the adapter circuitry. The receptacle further includes optical detection means for identifying the presence or absence of the plug extension. The transmission cable and the means for transmitting current are electrically isolated from the optical detection means.

The optical detection means includes two or more pairs of optical emitters/sensors. The emitters and sensors are positioned opposite one another such that when the plug is engaged with the receptacle, the extension blocks the paths of light between one or more of the emitters and sensors. The output signals (light passed or light blocked) from the optical sensors are directed to associated decode logic and then to computer software. Extensions may vary in length or have apertures or transparent regions formed therein designed to allow light to pass through from an emitter to a sensor. When the extension is inserted into the receptacle, a particular configuration of sensors will be activated. Using the output of the sensors, the computer software can identify the connector type.

DETAILED DESCRIPTION OF THE PREFERRED EMBODIMENTS

Figure 1:
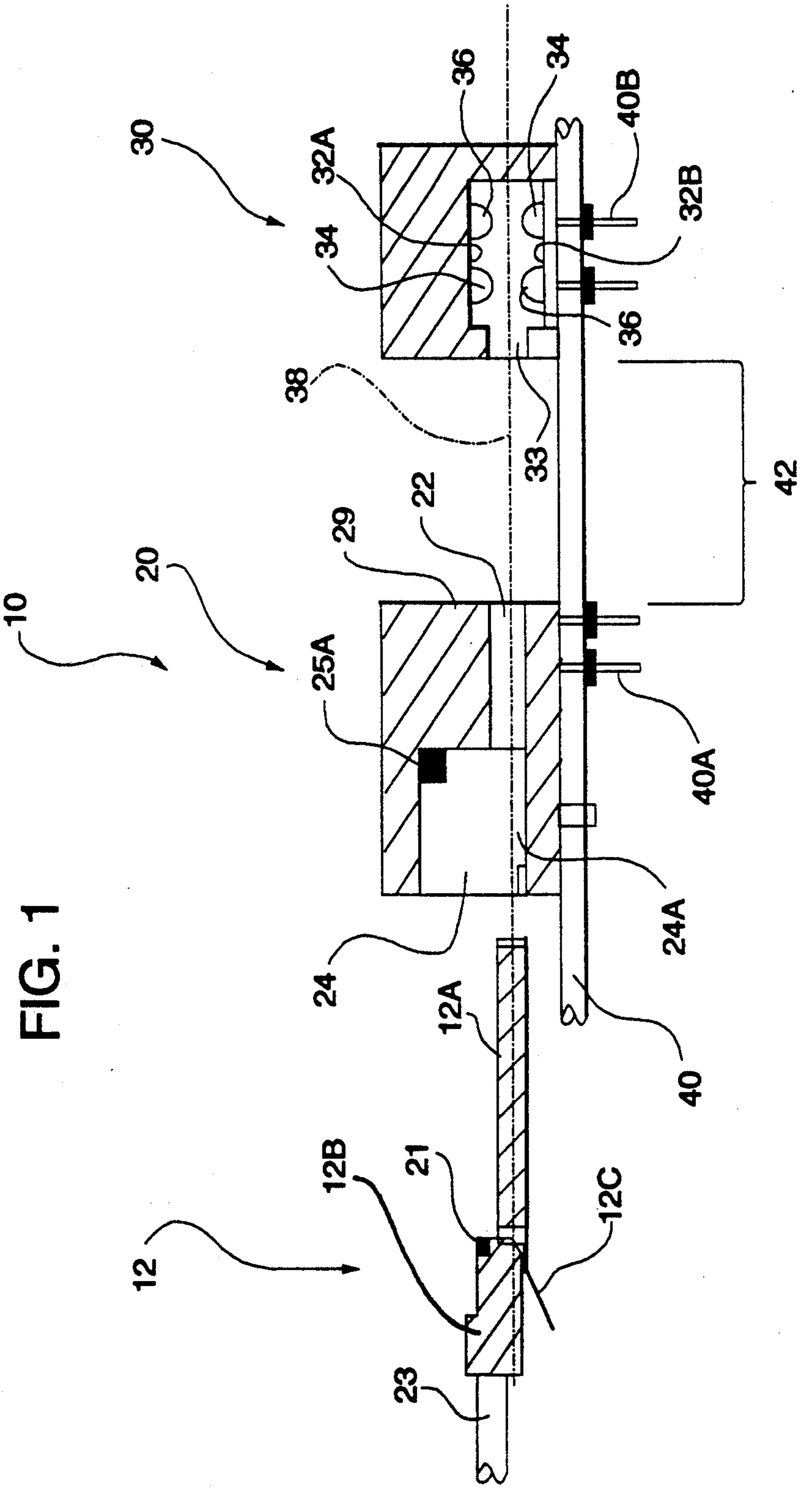
FIG. 1 is a cross-sectional, exploded side view of a first embodiment of the optical connector identification system of the present invention.

The electrically isolated optical connector identification system of the present invention is shown in the drawings and indicated generally by the numeral 10.

in one embodiment, shown in FIG. 1, identification system 10 basically comprises connector plug 12, first receptacle member 20, and a second receptacle member or optical identification member 30 (hereinafter In member 30).

Figure 3:
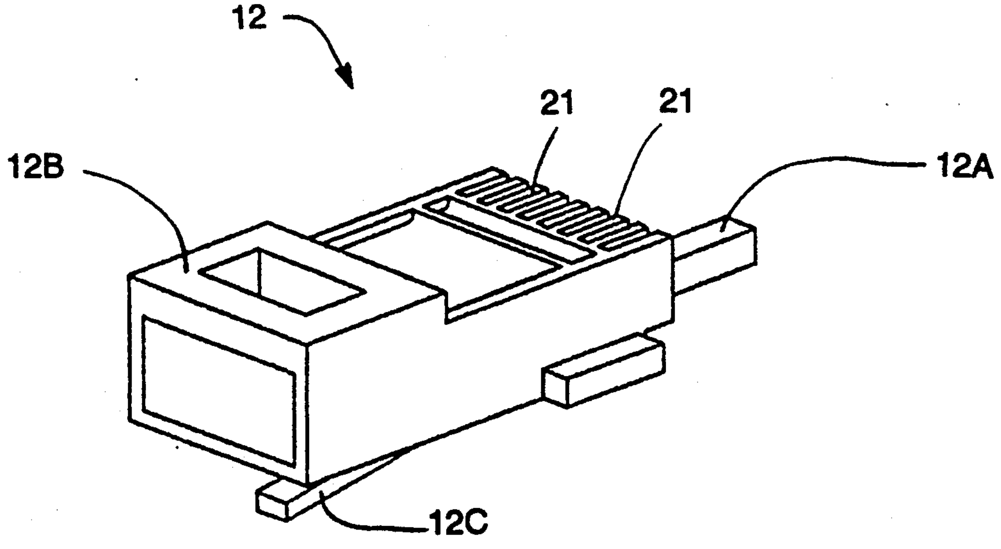
FIG. 3 is a perspective view of the connector plug of the present invention.

As shown in FIG. 3, plug 12 includes plug body **12*b*, extension 12*a*, contacts 21, and lock tab 12*c*. A transmission cable or the like, such as a common carrier transmission line, is electrically coupled with contacts 21. Extension 12*a*** will have a unique length or configuration of apertures or transparent regions formed therein, the significance of which is disclosed hereinafter.

Figure 2:
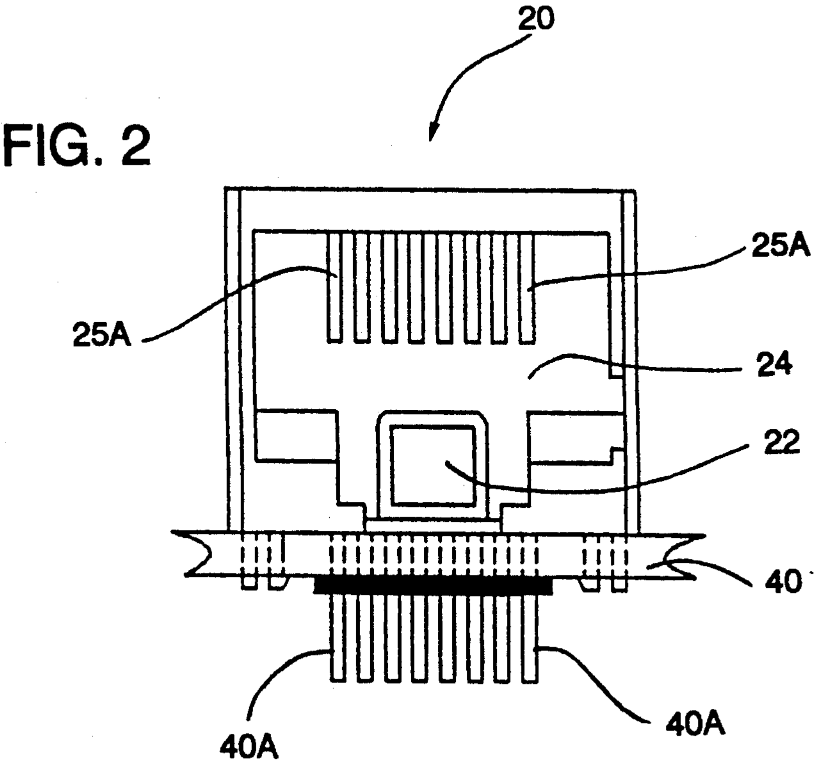
FIG. 2 is a front elevational view of the receptacle of the first embodiment of the optical connector identification system of the present invention.

As shown in FIG. 1, receptacle member 20 is supported by circuit card 40 and may be formed from plastic. First receptacle member 20 includes main cavity 24 which is designed to receive plug body **12*b* (See FIG. 2). Main cavity 24 includes lock tab recess 24*a* which is designed to receive and secure lock tab 12*c*. Formed in back wall 29 of first receptacle member 20 is opening 22. Opening 22 is sized to receive extension 12*a* and allow the same to pass through back wall 29. As shown in FIG. 2, first receptacle member 20 is provided with electrical contacts 25*a* and primary transmission leads (not shown) such that electrical signals from a transmission cable 23 attached to plug body 12*b* are transmitted to pad leads 40*a***.

Referring again to FIG. 1, ID member 30 is also supported by circuit card 40 and may be formed from plastic. ID member 30 has opening 33 leading to cavity 38, both of which are designed to receive extension **12*a*. ID member 30 is positioned such that extension 12*a* exiting first receptacle member 20 via opening 22 will project into cavity 38. Cavity 38 comprises two opposing interior walls, top wall 32*a* and bottom wall 32*b*. Optical emitters 36 and optical sensors 34 are attached to interior top and bottom walls 32*a* and 32*b* such that each emitter is opposed by a sensor. Sensors 34 and emitters 36 are electrically connected via emitter/sensor leads (not shown) to ID pad leads 40*b***.

In operation, plug 12 is inserted into first receptacle member 20, with extension **12*a* entering first. Plug 12 is locked in place by lock tab 12*c* and lock tab recess 24*a* such that contacts 21 interface with contacts 25*a*. When plug 12 is fully inserted, extension 12*a* extends through opening 22 and into cavity 38 of ID member 30. Extension 12*a* is opaque and has a predetermined length such that each type of connector has a distinctive length. In this way, each type of connector, corresponding to a particular type of cable and communications network, for instance, can be uniquely identified by the length of its extension 12*a*. When plug 12 is fully inserted into first housing 20 such that contacts 21 and 25*a* are interfaced, a portion of extension 12*a* will be disposed within cavity 38 between one or more optical emitter/sensor pairs. Extension 12*a* will thereby block the light emitted from one or more emitters. In the embodiment shown in FIG. 1, there are two emitter/sensor pairs. The length of extension 12*a* determines whether NEITHER, A_ONLY, B_ONLY, or BOTH of the light paths are open. The decode logic, shown in FIG. 5**, converts the sensors' outputs to the logic signals required by the associated computer means. These signals form a binary code by which the adapter software can determine the presence/absence and type of the connector. The type of the transmission cable can be derived from the type of the connector.

Figure 4:
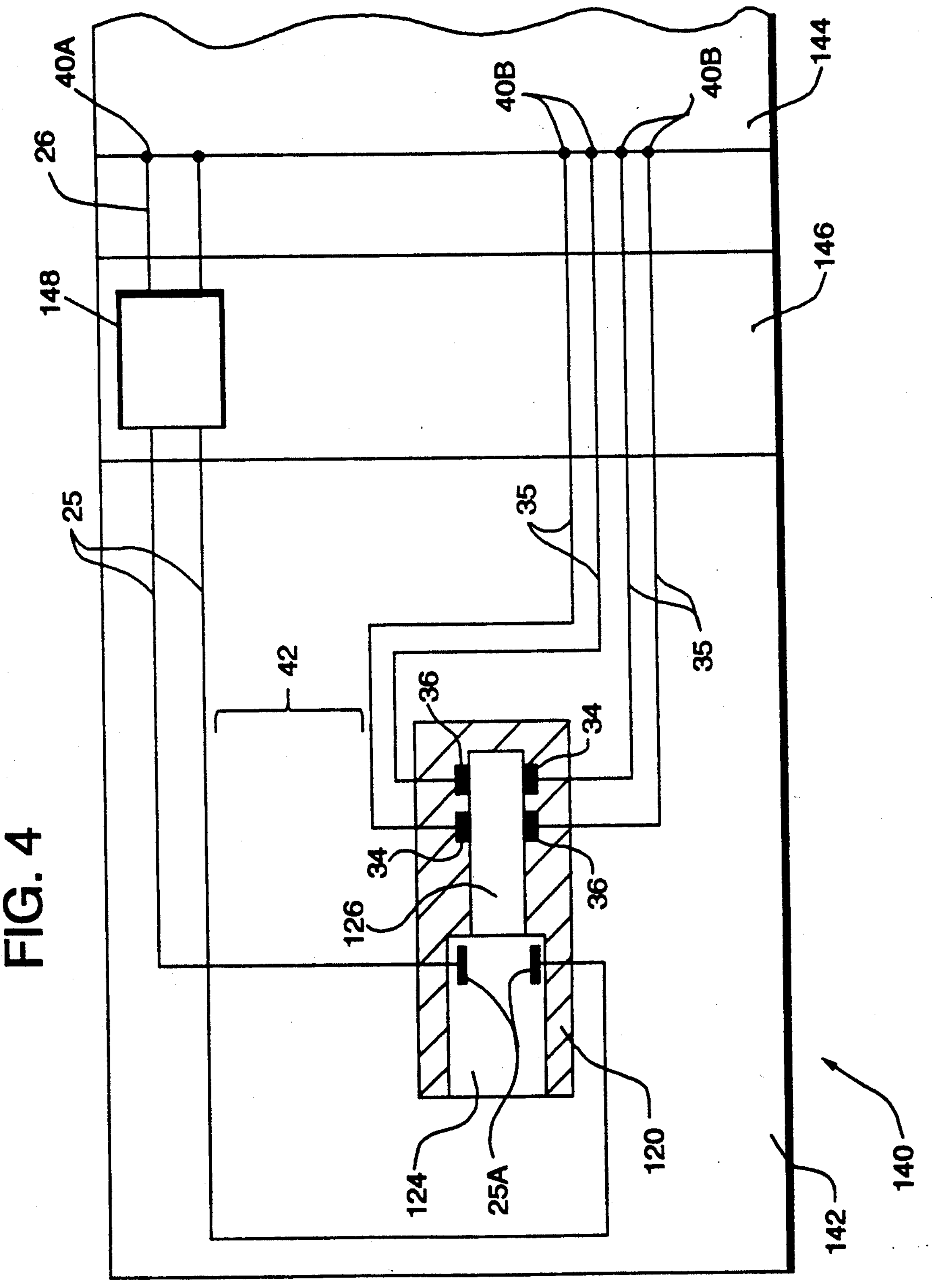
FIG. 4 is a top planar view of a second embodiment of the optical identification system of the present invention with the female receptacle shown in cross-section.
Figure 6:
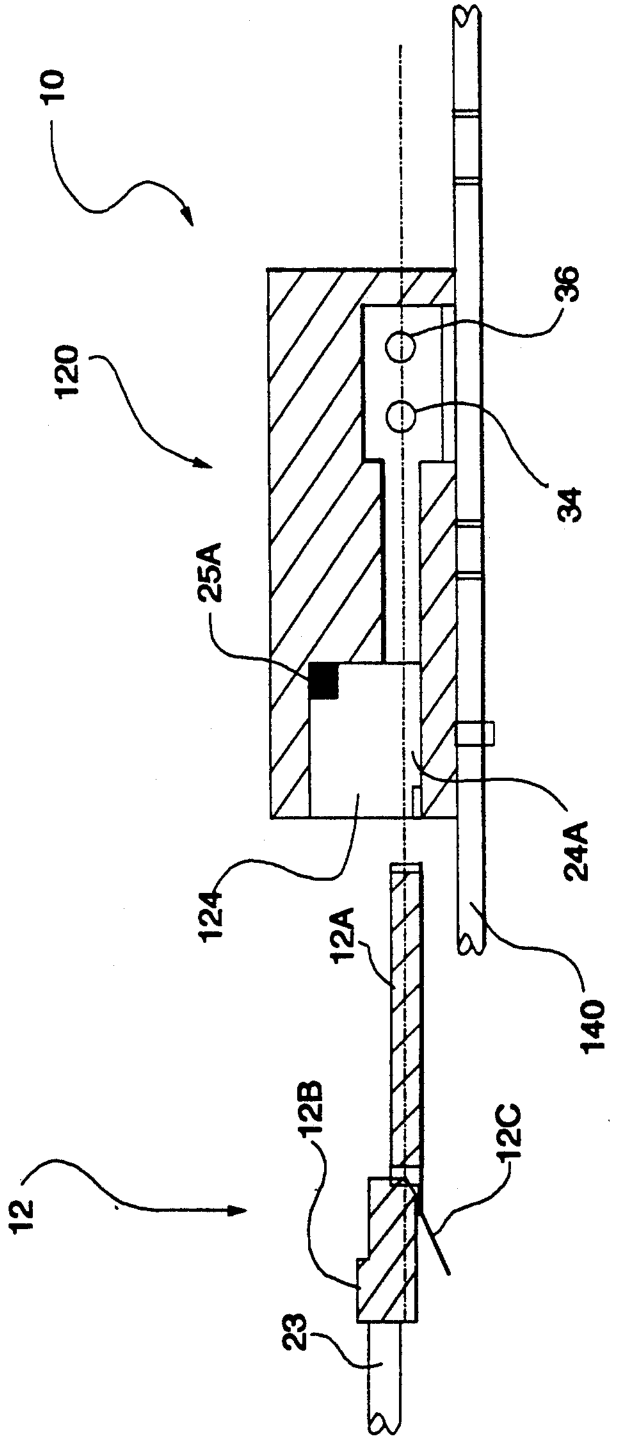
FIG. 6 is a cross-sectional, exploded side view of the second embodiment of the optical connector identification system of the present invention.

A second embodiment of the present invention is shown in FIGS. 4 and 6. More particularly, a top plan view showing the female receptacle member 120 in cross-section mounted to circuit card 140 is illustrated in FIG. 4 while an exploded side view in cross-section is shown in FIG. 6. In the second embodiment, the components of first receptacle member and ID member are combined in a single modular housing 120. Like the receptacle members of the first embodiment, modular housing 120 of the second embodiment includes main cavity portion 124 for receiving plug body **12*b* followed by guide channel 126 for receiving extension 12*a*. Optical emitters 36 and optical sensors 34 are embedded in the side walls of guide channel 126 on the end farthest from cavity portion 124. Extension 12*a* and emitters 36 and sensors 34** interact in the same way as described in the first embodiment to detect the presence of and identify the type of the connector.

Modular housing 120 is mounted to circuit card 140 for physical support as well as for electrical interconnection with the remaining circuitry. For safety purposes and voltage isolation requirements, circuit card 140 is divided into three portions: a transmission circuitry portion 142, a computer circuitry portion 144, and a bridge 146 (FIG. 4). Computer circuitry portion 144 is relatively low voltage and, according to certain safety standards, must be protected from power surges from incoming transmission lines of up to 3.75 kV. To provide this protection, current through primary transmission leads 25 from a transmission cable interfaced at contacts 25*a* located on the transmission circuitry portion 142, the potentially high voltage side, is buffered by transformer 148 located on bridge 146 before being transmitted via secondary isolated transmission leads 26 to pad leads 40*a*. Any other conduction paths between computer circuitry portion 144 and the transmission cable must be similarly buffered.

Voltage isolation between primary transmission leads 25 and emitter/sensor leads 35 is provided by the physical separation gap portion 42 of circuit card 40.

The need for buffering means between sensors 34 and pad leads 40*b* is obviated by the provision of the physical gap 42 between the transmission leads 25 and emitter/sensor leads 35. Due to the provision of optical emitters/sensors as opposed to an electrical sensing scheme, emitter/sensor leads 35 are electrically isolated from the potential surge source (transmission cable 23 and primary transmission leads 25) so that they are prevented from conducting a power surge from the source onto computer circuitry portion 144 of circuit card 140. The size of the physical gap 42 required will depend on the degree of electrical isolation required and the conductivity of the material between the leads. For example, it has been empirically determined that a 0.4 of an inch air gap between conductive bodies will provide electrical isolation up to 3.75 kV.

The embodiments described above may be modified. For instance, more than two emitter/sensor pairs may be implemented. The binary optical code can be used to identify $2^n$ different cable/connector plugs, where n is equal to the number of emitter/sensor pairs. Another modification is where extension 12*a* has alternating transparent regions or apertures formed therein, and/or opaque regions. The optical sensors and corresponding circuitry could identify the connector type by the configuration of transparent and opaque regions formed on the extension.

Figure 5:
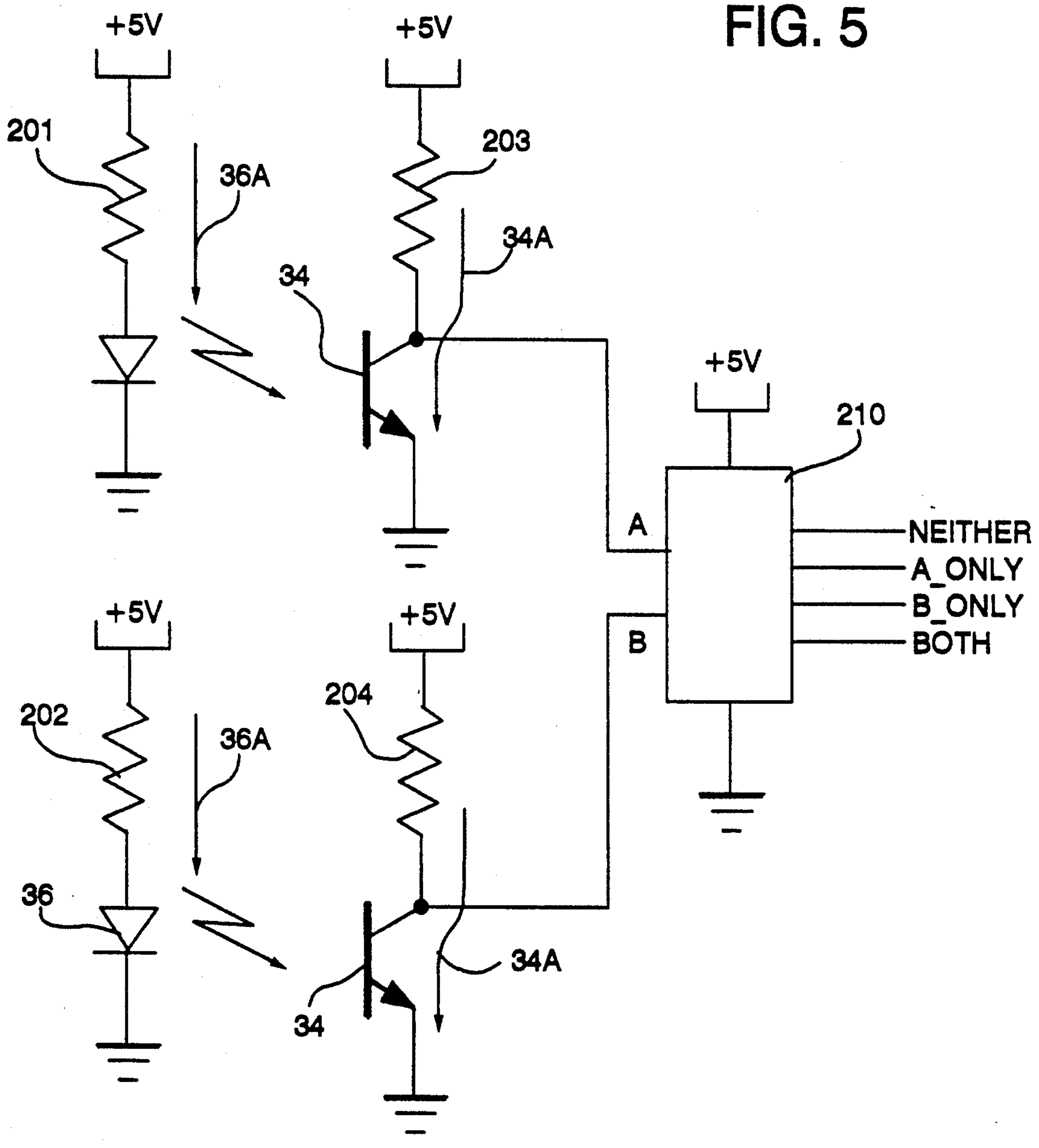
FIG. 5 is a schematic view of circuitry which could be used to implement the present invention.

Referring now to FIG. 5, an example of the decode logic which could be used to implement the identification system of the present invention is shown therein. Optical emitters 36 may be infrared light emitting diodes (LEDs) such as those used in the Siemens SHF900-4 Reflective Emitter/Sensor. Current 36*a* through optical emitters 36 is limited by resistors 201 and 202. As discussed above, optical sensors 34 receive light from emitters 36 if it is not blocked by extension 12*a* extending therebetween. Receipt of light turns on optical sensors 34 allowing current 34*a*, limited by load resistors 203 and 204, to pass therethrough. When light is not received by optical sensors 34, current 34*a* is cut off thereby developing the input signals to decoder 210. It will be apparent to those skilled in the art that there are a variety of ways in which the logic of the present invention may be implemented.

Although the invention has been described in terms of preferred embodiments with various enhancements and alternative implementations, those skilled in the art will understand that other embodiments and variations may be carried out without departing from the spirit of the invention.

What is claimed is:

1. A connector assembly of a predetermined type for use with a cable carrying electrical communication signals thereon comprising:

a plug member having a body and means, extending outwardly from said body, for indicating said predetermined connector type;

a receptacle having a cavity therein for receiving said plug member; and means, disposed in said cavity, for detecting said predetermined connector type indicating means, said detecting means comprising at least two optical emitters and at least two optical sensors and means for generating an output indicative of said predetermined connector type.

2. The connector assembly of claim 1 wherein said plug member includes means for operably engaging said cable, said electrical communication signals being electrically isolated from said detecting means.

3. The connector assembly of claim 2 wherein said optical emitters and said optical sensors are relatively disposed such that light from each optical emitter is directed towards a corresponding optical sensor and disposed such that, when said plug member is engaged with said receptacle, said predetermined connector type indicating means blocks the light from at least one of said optical emitters from reaching said corresponding optical sensor.

4. The connector assembly of claim 3 wherein said predetermined connector type indicating means is opaque and has a particular length, said length corresponding to a predetermined type of connector.

5. The connector assembly of claim 3 wherein said predetermined connector type indicating means has a particular configuration of apertures formed therein, said configuration of apertures uniquely corresponding to a predetermined type of connector.

6. A connector assembly of a predetermined type having an optical connector identification system for detecting the engagement and type of said connector, comprising:

a) a male connector having an extension extending outwardly therefrom;

b) a female connector for engaging said male connector so that electrical signals may pass therebetween, said female connector having a cavity formed therein for receiving said extension; and c) optical detection means disposed in said cavity comprising at least two optical emitter-sensor pairs for detecting the presence of said extension within said cavity, said optical detection means being electrically isolated from said electrical signals.

7. The connector assembly of claim 6 wherein said optical detection means further comprises means for generating an output indicative of the type of connector.

8. The connector assembly of claims 6 or 7 wherein the length of said extension corresponds to the type of connector.

9. The connector assembly of claims 6 or 7 wherein said extension comprises an array of apertures corresponding to the type of connector.

10. A receptacle for receiving a plurality of different types of plug members and for providing an indication of the particular type of an inserted plug member, each plug member of a particular type having a body and means extending outwardly from said body for indicating said particular type, said receptacle comprising:

a receptacle body having a cavity therein for receiving said plug member body and said type indicating means;

means, disposed in said cavity, for detecting said type indicating means, said detecting means comprising at least two optical emitters and at least two optical sensors, said optical emitters and said optical sensors being relatively disposed such that light from each optical emitter is directed towards a corresponding optical sensor and disposed such that, when said plug member is engaged with said receptacle, said type indicating means blocks the light from at least one of said optical emitters from reaching said corresponding optical sensor; and means connected to said detecting means for generating an output indicative of said particular plug member type.

* * * * *